Patented Apr. 2, 1946

2,397,631

UNITED STATES PATENT OFFICE 2,397,631

UNSATURATED CARBAMATE

Franklin Strain, Barberton, Ohio, assignor to Pittsburgh Plate Glass Company, Pittsburgh, Pa., a corporation of Pennsylvania No Drawing. Application February 7, 1944,
Serial No. 521,444

8 Claims. (Cl. 260—78)

This invention relates to a group of new unsaturated ester-amides having valuable applications as are described hereinafter.

The purpose of my invention is to prepare new compounds capable of being polymerized through olefinic groups into tough strong resins useful in casting and molding processes.

Long chain type esters having terminal polymerizable groups form very desirable transparent polymers. However, these resins frequently have low strength properties which make them unsuitable for many uses. Accordingly, it is a further purpose of my invention to provide methods of preparing new resin compositions having greatly improved flexural and tensile strengths.

The new group of compounds of my invention may be regarded as the N,N'-substituted bis (unsaturated carbamic acid esters) in which the two amide groups are connected by an organic molecular structure containing two or more ester linkages. By ester linkages I mean oxygen atoms which are adjacent carbonyl groups. Thus, a carbonate

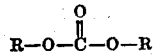

will have two ester linkages.

More specifically, the new esters are bis [N-(carbalkenyloxy) aminoalkyl] esters of the real or theoretical dibasic acids which are characterized by having two acid reacting hydroxyl groups each attached to a carbonyl carbon atom. The alkenoxy substituents of the new esters contain less than five carbon atoms and an olefinic group adjacent the second carbon atom from the oxygen atom therein. The aminoalkyl radical also contains less than five carbon atoms.

The dibasic acids of which the new compounds are symmetrical esters are the carboxylic acids, including phthalic, succinic, adipic, and malonic acids, carbonic acid and the theoretical bis (carbonic acid) esters of the various glycols and polyglycols such as diethylene glycol bis (carbonic acid) and the corresponding acids of other glycols.

The compounds of my invention may readily be prepared by reacting an unsaturated chloroformate, such as allyl or vinyl chloroformate with an amino alcohol while cooling to 15° C. Subsequently, the hydroxy ester so formed is reacted with an acid chloride of a dicarboxylic acid or with phosgene.

The vinyl chloroformate used in the above reaction may be prepared by the pyrolysis of ethylene glycol bis (chloroformate). This compound is preferably made by heating the ethylene glycol bis (chloroformate) at 300 to 600° C. and separating the vinyl chloroformate by fractional distillation of the reaction product. The preparation is described and claimed in Serial No. 504,292 filed September 29, 1943, by Frederick E. Küng, now U. S. Patent No. 2,377,085.

The same unsaturated ester amides may also be prepared from other reactants. For example, diallyl carbonate, or the carbonate of other unsaturated alcohols having an olefinic group adjacent the second carbon atom from the hydroxyl group, may be reacted with an amino alcohol such as ethanolamine, 3-aminopropyl alcohol, or isopropanolamine to form an intermediate which can be reacted with acid chlorides of dibasic acids to form the new esters. The preparation of the intermediate may be conducted by mixing the reactants, for example diallyl carbonate and ethanolamine, at room temperature. This ester interchange substitutes one amino alcohol group for one of the unsaturated radicals of the carbonate to form a N-(carbalkenyloxy) aminoalkyl alcohol. Generally, slight heating is desirable to initiate the reaction and then to maintain a moderate temperature of 30° C. or 40° C. while cooling periodically. At the higher temperatures the reaction is completed in a much shorter period of time.

The intermediates thus produced are reacted with acid chlorides of dibasic acids such as adipyl chloride, succinyl chloride, or the acid chlorides of other dicarboxylic acids, with diethylene glycol bis (chloroformate) or the bis (chloroformates) of other glycols, or with phosgene (the acid chloride of carbonic acid) to produce the new compounds.

The reaction between the acid chloride and the intermediate is conducted in liquid phase in the presence of an alkaline reagent such as pyridine or other cyclic tertiary amine or an oxide, hydroxide or carbonate of an alkali metal or an alkaline earth metal. The reactants are so combined that an excess of a strongly alkaline reagent will not exist in the presence of the final product at any time. It is also undesirable for strong alkali to be present in contact with the intermediate hydroxy compound. Accordingly, the intermediate and the acid chloride may be mixed and the alkaline agent added slowly while the reaction temperature is maintained at normal room temperature or lower by artificial cooling. The reaction may also be conducted by slowly adding separate streams of alkaline agent and one of the other reactants to the third reactant. The reaction vessel is advantageously provided with a stirring mechanism and an artificial cooling means such as refrigerated brine coils or an ice bath. The ester-amide produced is usually washed with dilute hydrochloric acid and then with dilute caustic soda followed by water.

The new polymerizable compounds are usually colorless liquids, but may in some instances be solids of relatively low melting point. Their polymers are hard transparent resinous solids having exceptional hardness and resistance to abrasion and yet having unusual toughness and flexural strength.

The new ester-amides are capable of being polymerized when subjected to heat or ultraviolet light especially in the presence of polymerization catalysts such as organic peroxides and organic percarbonates. When polymerized, the liquid monomers gradually become viscous and finally set to colorless transparent gels which are rigid and somewhat tough. If the initial polymerization has been conducted at a moderate temperature in the presence of an oxygen yielding catalyst it is possible to obtain an intermediate polymer which contains some unconsumed catalyst. Such compositions are capable of further polymerization to form hard clear solids. When the initial catalytic polymerization is induced at higher temperatures the rate of decomposition of catalyst may exceed the rate of polymerization and a softer polymer may be formed. Such inefficient utilization of catalyst is undesirable. For each combination of ester-amide and catalyst there is an optimum quantity of catalyst and temperature of polymerization which may be determined experimentally by balancing the respective economies of degree of polymerization and cost of catalyst against the time required for polymerization.

There is a further practical limitation on the rate of polymerization. The polymerization reaction being exothermic, the rate of reaction must be slow enough to permit the dissipation of the heat of reaction. Otherwise, the rise in temperature will increase the rate of polymerization, thereby generating progressively increasing quantities of heat until the uniformity of the polymer is destroyed by heat fractures. High polymerization temperatures may also cause discoloration in the polymer. Accordingly, lower temperatures are preferred.

Polymerization takes place in the absence of catalysts, but higher temperatures are required. Due to the difficulty of maintaining uniform polymerization conditions and due to the discoloration and fracturing induced at higher temperatures, polymerization in the presence of peroxy catalysts is preferred.

The quantity and kind of peroxy catalyst to be used should be determined by the nature of the monomer to be reacted. Very active monomers such as the vinyl esters need only small quantities such as from 0.01 percent to 0.5 percent by weight of the monomer, while moderately active monomers such as the allyl derivatives may require up to 5.0 percent. It has been found that different types of peroxy catalysts are effective at different temperatures; for example, the percarbonates will catalyze the reaction at 30° to 60° C., acyl peroxides are effective at an intermediate range (65° to 95° C.), while the ketone peroxides are effective at temperatures in excess of 110° C. The kind of catalyst should be selected in accordance with the activity of the monomer. Very active vinyl derivatives require low temperature catalysts since at high temperatures the polymerization may be too rapid. Conversely, relatively less active monomers such as crotyl or cinnamyl esters must be heated to relatively high temperatures and require a catalyst which will be stable until the higher temperature zones are reached.

In the usual polymerization procedure it has been found desirable to initiate the reaction at relatively low temperatures. After the polymerization has begun it is possible to increase the temperature with less danger of heat fracture and discoloration. Accordingly, the quickest satisfactory reaction is obtained by raising the temperature as rapidly as possible without fracturing or discoloring the product. Such gradually increasing temperature schedules are more efficient in the utilization of peroxy catalysts since they promote a more nearly uniform reaction rate throughout the entire polymerization. The temperature schedules may be devised by trial and error methods, or they may be determined experimentally by analyzing for peroxy compound during the progress of the reaction and regulating the temperature so that the peroxy compound is consumed at a uniform rate. The following time-temperature schedule is typical for the polymerization of bis [N-(carballyloxy)-aminoethyl] carbonate using benzoyl peroxide as the catalyst:

| Temperature | Time |
| --- | --- |
| | Hours |
| 70° C | 1 |
| 71° C | 2 |
| 72° C | 3 |
| 74° C | 4 |
| 76° C | 5 |
| 78° C | 6 |
| 81° C | 7 |
| 85° C | 8 |
| 90° C | 9 |
| 96° C | 10 |
| 104° C | 11 |
| 115° C | 12 |

The new esters are useful in many applications such as in coating compositions, in laminated fabrics or in impregnation of cloth or random fiber compositions or as adhesives. They are especially useful because of the very small loss of volume or shrinkage which occurs during polymerization. For this reason they are very useful in the preparation of cast shapes especially where transparent, translucent or light colored products are required. Generally an irregular shape normally utilizing glass may be advantageously constructed with the new resins because of the much greater toughness and high flexural strength obtained without much sacrifice in abrasive resistance.

The new materials may be copolymerized with other thermosetting resins or with the thermoplastic synthetics such as vinyl acetate, styrene, methyl methacrylate, vinyl chloride, vinylidene chloride or other materials capable of ethylenic polymerization.

Further details of the preparation and use of the new materials are set forth in the following examples:

Example I

A mixture of 183 g. of ethanolamine and 426 g. of diallyl carbonate was permitted to stand at room temperature for 20 hours. During that period the temperature reached a maximum of 44° C. at the end of the first hour. The mixture was heated at 4 mm. pressure at 50° C. to remove the allyl alcohol and excess diallyl carbonate. The residue was distilled and the fraction boiling at 127–130° C. (2 mm.) was separated. It was identified as N-(carballyloxy) amino ethyl alcohol.

A mixture of 319 g. (2.2 moles, 10% excess) of this compound, and 174 g. pyridine was cooled to −10° C. by submerging the reaction flask in a salt-ice bath. Gaseous phosgene was passed therethrough at the rate of 0.020 mole per minute for fifty minutes while stirring continuously. The temperature did not exceed +8° C. during the reaction. When the phosgene flow was stopped the thick salt slurry was thinned with 50 cc. benzene and stirred for 30 minutes. Sufficient water was added to dissolve the salt, thus forming two liquid phases. The nonaqueous layer was washed five times with equal volumes of dilute hydrochloric acid, three times with 2% NaOH and three times with water. The mixture was heated at 25 mm. to remove the benzene and at 4 mm. for 45 minutes. A light yellow liquid ($n_D^{20}=1.4780$) which solidified upon standing (M. P. 42° C.) was identified as bis [N-(carballyloxy) aminoethyl] carbonate:

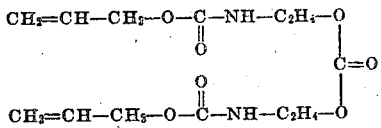

*Example II*

A mixture of 348 g. of N-(carballyloxy) aminoethyl alcohol (see Example I above) and 190 g. of pyridine was prepared in a 2000 ml. reaction flask provided with a mechanical stirring device, a thermometer well and a dropping funnel. The mixture was cooled to 0° C. and 187 g. of ethylene glycol dichloroformate was introduced through the dropping funnel at a rate which permitted the maintenance of a reaction temperature no higher than 5° C. The product was purified by topping at 5 mm. pressure. The ester-amide was ethylene bis [N-(carballyloxy) aminoethyl carbonate]; a colorless viscous fluid having an index of refraction ($n_D^{20}=1.4778$) a density of 1.2457 (20° C.) and the following molecular structure:

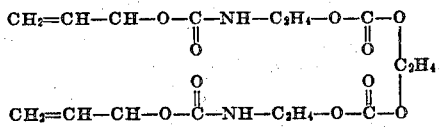

The ester-amide was mixed with 5 percent benzoyl peroxide and heated at 75° C. for 36 hours. A clear hard and tough casting was obtained.

*Example III*

A mixture of 145 g. of N-(carballyloxy) aminoethyl alcohol (see Example I above), 100 g. of pyridine and 100 cc. of benzene was placed in a 500 cc. reaction flask fitted with a dropping funnel, a mechanical stirrer and a thermometer. While the temperature was maintained below +5° C. by means of an ice bath, 102 g. of phthalyl chloride were added gradually over a one hour period. The reaction mixture was stirred for two hours while it was permitted to warm to room temperature. The crude ester-amide was washed three times with 200 cc. portions of dilute hydrochloric acid (5 percent), two times with 4 percent NaOH and finally twice with water. The benzene was evaporated by heating at 100° C. (4 mm.) for one hour. The product, bis [N-(carballyloxy) aminoethyl] phthalate was a yellowish colored viscous liquid having an index of refraction of 1.5210 and a specific gravity of 1.227. It had the following structure:

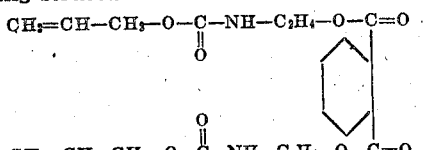

The ester-amide was mixed with 5 percent benzoyl peroxide and cast in a sheet mold (6″ x 6″ x 0.25″). A clear almost colorless sheet of tough hard resin was thereby obtained.

While the invention has been described with reference to certain illustrative embodiments, it will be apparent to those skilled in the art that various modifications thereof may be practiced without departing from the purview of the invention as defined in the appended claims.

What I claim is:

1. As a new compound, a bis [N-(carbalkenyloxy)aminoalkyl] ester of a dibasic acid which acid has two acid reacting OH groups each attached to a carbonyl carbon atom, in which compound the aminoalkyl and alkenoxy substituents each contains less than five carbon atoms and the olefinic bond in the alkenoxy substituent is adjacent the second carbon atom from the oxygen atom therein.

2. As a new compound, bis (N-carballyloxyaminoethyl) carbonate.

3. As a new compound bis (N-carballyloxyaminoethyl) phthalate.

4. As a new compound ethylene bis (N-carballyloxyaminoethyl carbonate).

5. A polymer of the compound defined in claim 1.

6. A polymer of the compound defined in claim 2.

7. A polymer of the compound defined in claim 3.

8. A polymer of the compound defined in claim 4.

FRANKLIN STRAIN.